United States Patent
Huff

[15] 3,662,897
[45] May 16, 1972

[54] CUTTING SAMPLE RECOVERY DEVICE

[72] Inventor: Kenneth O. Huff, 275 Townsend Building, Casper, Wyo. 82601

[22] Filed: Sept. 8, 1970

[21] Appl. No.: 69,996

[52] U.S. Cl. ........................................................ 210/523
[51] Int. Cl. ...................................................... B01d 21/06
[58] Field of Search .................. 210/217, 394, 403, 523

[56] References Cited

UNITED STATES PATENTS 2,758,722   8/1956   Murray .................................. 210/394

FOREIGN PATENTS OR APPLICATIONS 526,519   3/1954   Belgium ................................ 210/394

*Primary Examiner*—J. L. De Cesare
*Attorney*—Sol B. Wiczer

[57] ABSTRACT

A sampling device for recovery of cuttings suspended in a fluid, such as a drilling mud containing suspended cuttings produced in oil well drilling, comprising a slowly driven rotary drum having openings in its ends and riffle plates and into which the drilling fluid returning from an oil well is continuously discharged to settle and deposit the cuttings on the lower wall of the rotating drum, the supernatant fluid being continuously passed outward through an open end of the drum, the drum having vanes mounted on its wall which lift the settled cuttings, a series of nozzles disposed in the drum which discharge streams of water upon and wash mud from the cuttings in each vane as it unloads cuttings upon an angularly mounted trough centrally through the open ends of the drum, the trough having perforations at one end to classify the washed cuttings passing downward and outward of the drum, and having containers mounted beneath the perforations to collect the washed recovered cuttings.

18 Claims, 8 Drawing Figures

INVENTOR
KENNETH O. HUFF
BY Sol B Wiep
ATTORNEY

INVENTOR
KENNETH O. HUFF
BY *Sol B Wiegl*
ATTORNEY

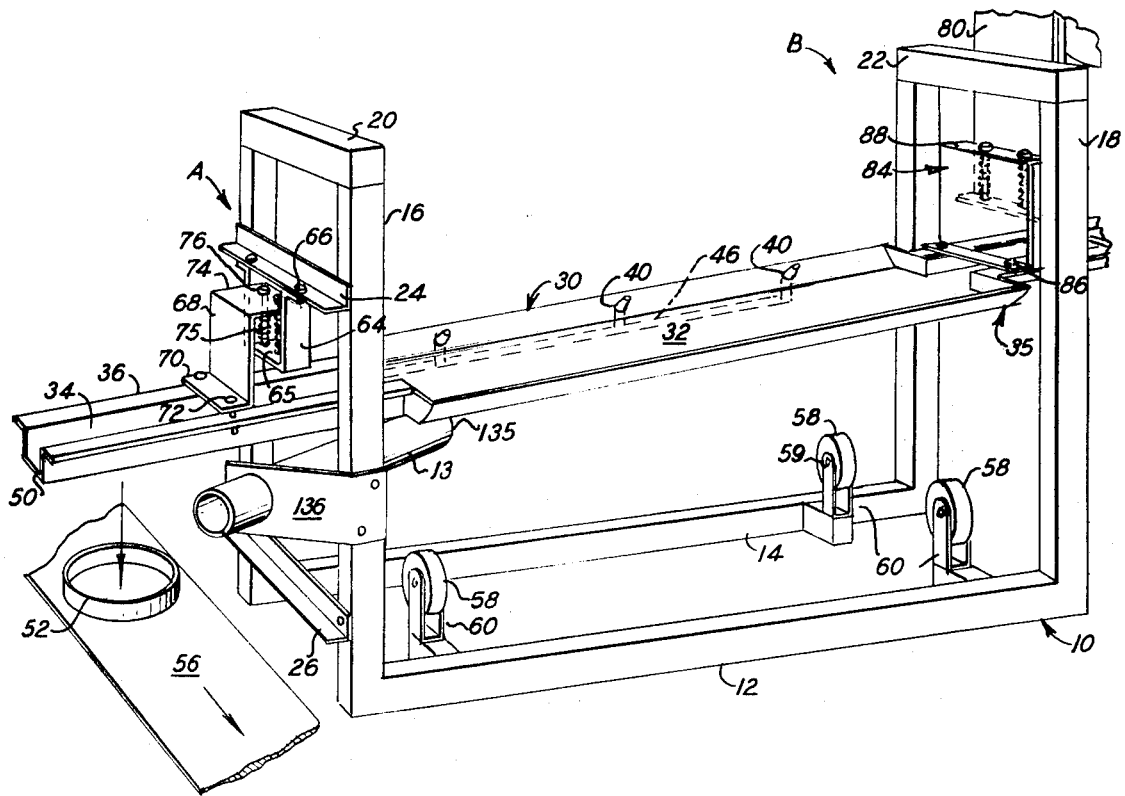

CUTTING SAMPLE RECOVERY DEVICE

This invention relates to an improved sampling device for continuously separating sample cuttings from drilling mud as circulated from an oil well being bored with a rotary well drilling rig. More particularly, the invention relates to a rotary mounted drum in which settled cuttings carried by circulating mud are continuously lifted, washed, deposited upon a chute, and thence passed to a container.

In earth boring such as in drilling of oil wells, the drilling fluid such as mud is conventionally passed into the well bore to cool and lubricate the rotary bit, and float the cuttings back to the surface where they are deposited in a slush pit. It is desirable to sample the earth strata at frequent regular intervals as the drilling of the well progresses. It is difficult and most laborious to regularly manually wash the mud from the cuttings for test. While efforts have been made in the art to mechanize the practice of manually separating cuttings from the mud, putting the separated samples into containers, the present device is a substantial improvement over prior mechanical efforts to automatically separate, clean and deposit cuttings into a container for later packaging and testing.

One important aspect of this invention is in the deposit of a continuous flow of drilling fluid returning from a well with a normal suspension of cuttings therein within a rotating drum sized and rotated at a rate to allow the cuttings to be deposited while the supernatant mud continuously flows out. The rotating drum has a series of vanes mounted and evenly spaced about the inner wall of the drum to pick up the settled cuttings as the drum rotates. Several nozzles form a washing spray upon the cuttings and the cleaned cuttings are deposited upon a vibrating trough as the vanes are inverted. Further classification and cleaning of the cuttings may be effected upon the trough while the cuttings pass to a sample recovery container for further packaging.

The continuous automatic cleaning, classifying and collecting of the cuttings regularly provides a series of samplings which may be packaged and identified with the portion of the well through which the rotary bit is passing in contact. That is, the regularly separated clean cuttings allows orientation of the samplings of each container load with the layer or strata from which they originated within the well for later identification and testing.

The invention is further described in relation to the drawings which, in the specific embodiments shown, are intended to be illustrative for specific description of the invention and not limiting, wherein:

FIG. 5 is a view of the frame with the drum removed in perspective;

FIG. 7 is a detail of the cam operated valve; and

FIG. 8 is a modification of the drum outlet.

Figure 1:
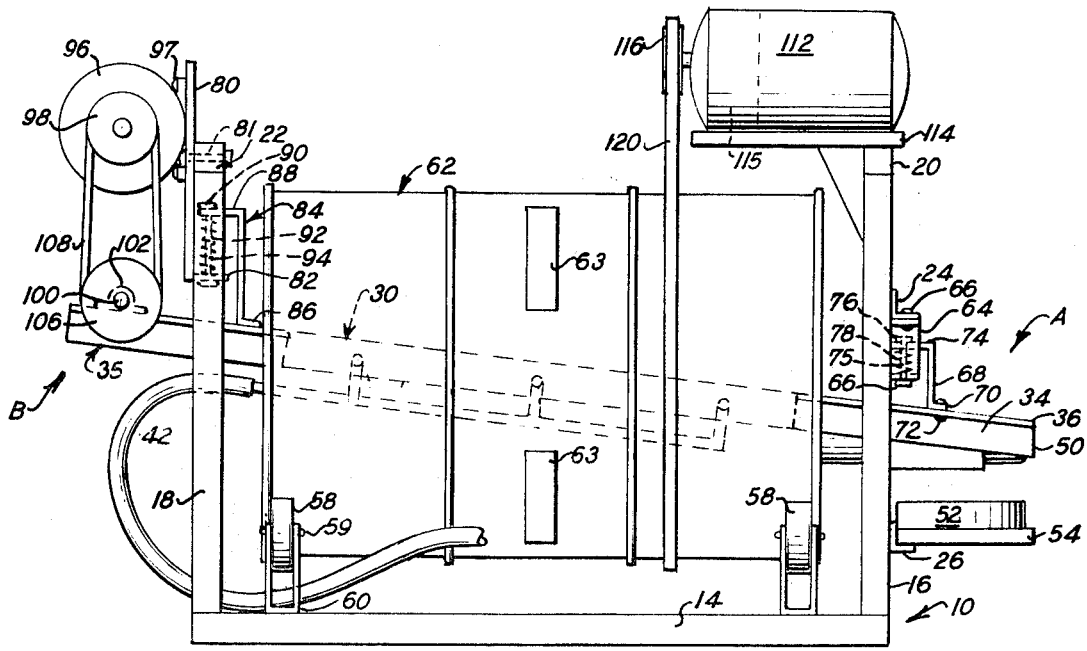
FIG. 1 is a side elevation of the device showing the rotary mounting of the drum from the right hand side.
Figure 2:
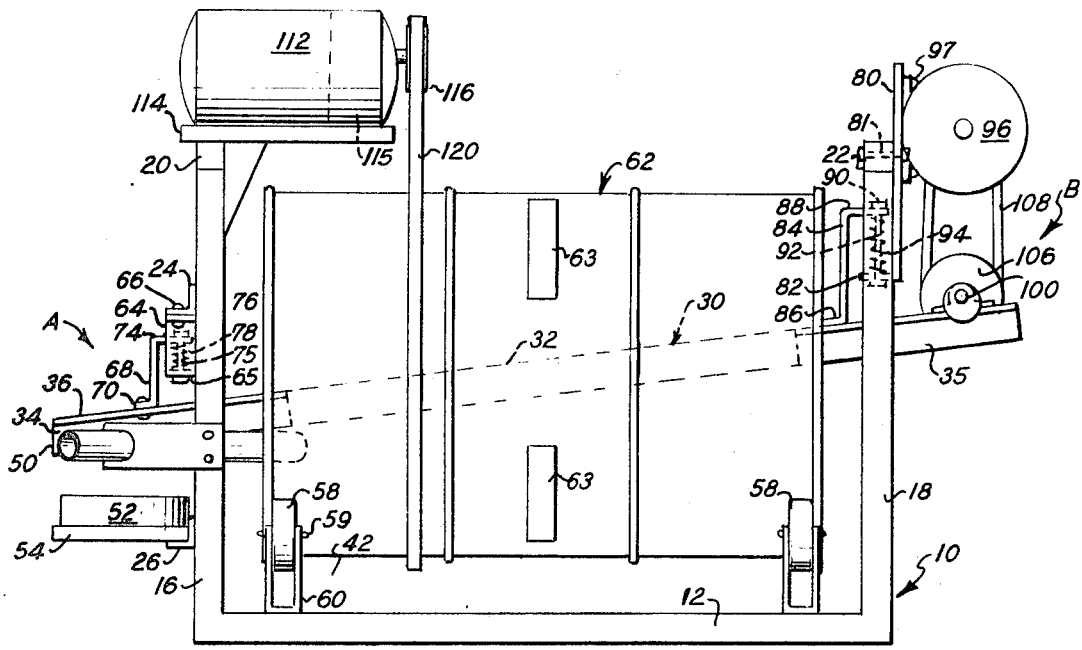
FIG. 2 is a corresponding left hand side elevation with respect to FIG. 1 including the drum drive.

Referring to the several figures, a frame 10 comprising lower horizontal support members 12 and 14 has vertical support members 16 and 18 which are rigidly mounted at each end. The side frame members are fastened together by horizontal top cross bars 20 and 22 and intermediate angle iron cross braces 24 and 26 at the forward end A as seen in FIG. 5.

Extending longitudinally through the center open portion of the frame 10 is a trough 30 which has a wide portion 32 disposed between the upright supports 16 and 18, and a narrower portion 34, continuing outward through the forward end A. At the forward end A the trough is substantially U-shaped, terminating at its top in a reenforcing flange 36. At the central portion the trough merely has angularly extending sides 38, one side of which supports a series of water nozzles 40 disposed therealong for distribution of water in a series of fan-like jets as shown diagrammatically in FIG. 6. The nozzles 40 are supplied wash water from a water hose 42 controlled by a valve 44 which distributes the water in intermittent flows to a manifolding header 46, shown in dotted outline in FIG. 5, the nozzles 40 each communicating with the header 46 for supply of water thereto.

Figure 4:
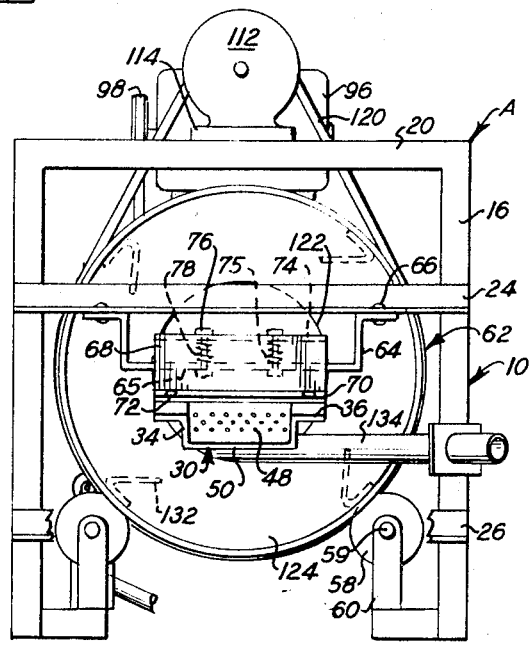
FIG. 4 is an opposite end view A of the device showing the cutting sample outlet.

As shown in FIG. 4, the forward end 34 of the trough extending outward of the framework 10 has perforations 48 adjusted in size to pass particles or pieces of the cuttings of average or usual size available, so that the perforations are adjusted to separate very large pieces for passing through the perforations the desired sampling size of cuttings only. Larger pieces will be retained on the trough and may be removed from the protruding open end 50. Particles of cuttings may drop through the perforations 48 into a container 52 mounted beneath the perforations supported on a ledge or shelf 54, fastened to and extending from the cross brace 26. The sampling container 52 may be removed manually for emplacing a sample at regular intervals into another sampling container such as a bag (not shown) for ultimate storage, inspection and test, the package or bag being usually tagged to indicate the time and other orientating data to identify the sample with the portion of the well bore from which the sample originated.

In alternate construction indicated in dotted line outline in FIG. 5, the sampling container 52 may be fixedly mounted on a moving conveyor belt 56, replacing support ledge 54, which carries the sampling container 52 to a packaging device (not shown) having a hopper in which the contents of the sampling container 52 are dumped and distributed by the hopper into bags (not shown) for subsequent inspection and testing. The bags are marked for identification as sample packages of the cuttings, the bags preferably being transparent for inspection and test.

Fastened to the cross bar 24 at the forward end A is a U-shaped bracket 64, as by bolting at 66. A Z-bracket 68 has its lower leg 70 bolted at 72 across upper flanges 36 of the forward protruding end 34 of the trough 30. The upper end 74 of the Z-bracket extends into the upper portion of the open space of the U-bracket 64. Several bolts 76 are fastened and extend through the end 74 of the Z-bracket 68 with their shanks 75 extending downward and through aligned holes in the lower end 65 of the U-bracket 64, in sliding fit. Several springs 78 are mounted about the shanks 75 of the bolts 76, fitting in compression between the upper end 74 of the Z-bracket 68 and the lower end 65 of the U-bracket 64. Thus the Z-bracket 68 resiliently supports the forward end 34 of the trough 30 upon the springs 78 in compression.

The after end B of the device has an angle plate 80 fastened by bolts 81 at its center to the cross frame member 22, terminating in a lower angle bracket end 82. An after Z-bracket 84 has a lower end 86 secured to the after end 35 of the trough 30. The upper end 88 has several bolts 90 fastened thereto with shanks 92 extending downward from the end 88 to pass through a pair of aligned holes in the bottom leg 82 of the plate 80 bored for receiving the bolts 92 in sliding fit. Several springs 94 are mounted about the shanks 92, whereby the after trough end 35 is supported upon the springs 94 between flanges 88 and 82 resiliently, with the springs in compression.

A vibrator motor 96 is bolted at 97 to the plate 80 and has a driving pulley 98 on its armature end. A vibrating shaft 100 is supported at each end in journal bearings in the ends of brackets 102 secured upon a bracket plate 104 fastened to extend from the after end 35 of the trough 30. A lower driving pulley 106 is fastened to one end of the vibrating shaft 100 and receives a belt 108 for driving communication with pulley 98 on the end of motor 96 for the rotation thereby. An eccentric weighted wheel 110 is fastened to the opposite end of vibrating shaft 100 to supply an imbalance, causing consequent vibration to the shaft 100 and after end of the trough 35 to which it is fastened. Thus as the motor 96 drives the pulley 106 with the imbalance supplied by the eccentrically weighted wheel 110, the trough 30 is caused to vibrate at its after end 35 as resiliently supported on springs 94, imparting a corresponding vibration to the spring mounted forward end of the trough. The trough 30, it will be noted, is thus resiliently supported upon springs with means for vibrating the same at its after end. The trough thus mounted is at a slightly inclined angle front to rear whereby, upon vibration, the cuttings deposited thereon move from the center of the trough downward toward the forward outlet end A, passing the cuttings through the perforations 48 therein, and larger pieces from the open end 50.

Fastened to the lower side members of the frame 10 are four support rollers 58, supported for rotation upon axles 59, journaled into brackets 60, which are fastened to the side of the frame member at each end, two to side member 12 and the other two to side member 14. Mounted for rotary support upon rollers 58 is a washing and sampling drum 62. A driving motor 112 is secured to a plate bracket 114 which in turn is fastened to the center cross bar 20. The motor through a speed reduction transmission 115 drives a pulley 116 which in turn drives a belt 120 entrained therearound and around the drum 62 for slow driving rotation of the drum as it is supported on rollers 58.

Figure 3:
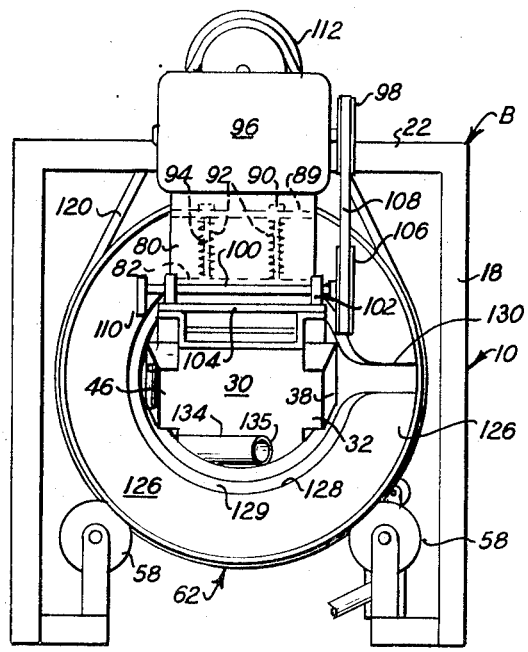
FIG. 3 is an end view B showing the mud outlet and vibrating mechanism.

The drum 62 has a small opening 122 in the forward end A thereby providing a deep annular fluid retaining flange 124 so that the liquid contents of the drum will not be emitted from the forward end A. The after end B of the drum, as shown in FIG. 3, is enclosed by a similar flange comprising a riffle plate 126 having a larger diameter opening 128. Several, at least one, intermediate riffle plates indicated in outer outline 129 of intermediate depth or similarly sized to that of plate 126, are mounted evenly spaced from inlet end A to outlet end B. The outlet and all intermediate plates each have a slot 130 to allow small settled fines to be discharged from the drum, thereby preventing accumulation of sediment within the drum, allowing discharge of heavier sediment from the drum.

Mounted longitudinally against the cylindrical wall of the drum and extending from end to end are several vanes 132 as shown in FIG. 4. These vanes are bent to an angle extending approximately 45° to the tangent of the drum at the point of attachment at the drum wall. Thus, each of the vanes on the drum wall extending the length of the drum forms a trough capable of holding settled particles scooped up as settled from the drilling mud flowing through the drum as the drum rotates.

As shown diagrammatically in FIG. 7, a valve 44 having a closure head 45 fastened to a stem 47 is biased to seated position upon valve seat 49 by a spring 51. Spring 51 bears at one end against the valve housing 53 and at the other end against a forked bracket 55. The outer end of the bracket 55 has two forked arms 57 supporting a roller 59 for rotation therebetween. The valve 44 is positioned with respect to the rotating drum 62 so that the roller 59 bears against the cylindrical surface of the drum as it rotates. One or more cam tracks 63 are disposed as a track about the cylindrical drum surface and positioned thereon to be contacted by the roller 59 of the valve so that the cam track 63 in rotation of the drum pushes the valve stem to open the valve against the compression of spring 51, or by release of a stem, the cam 63 being discontinuous at points, biasing the roller and valve stem 47 outward toward the drum surface to closed position of the valve closure. As stated, the valve is connected at one end with a supply of water 42 and at the other end with the manifolding 46 for distribution of the water to the nozzles 40. Consequently, upon rotation of the drum by the motor 112 the cams 63, rotating with the surface of the drum, alternately open the valve 44 and thereby provide a spray of water 41 to the nozzles 40. The nozzles 40 are positioned to direct a spray of water upon the contents of a vane 132 when it reaches unloading position above the tray, whereby the mud and cuttings therein are washed as they are discharged from the vane into the open wide portion of the trough 30.

Figure 6:
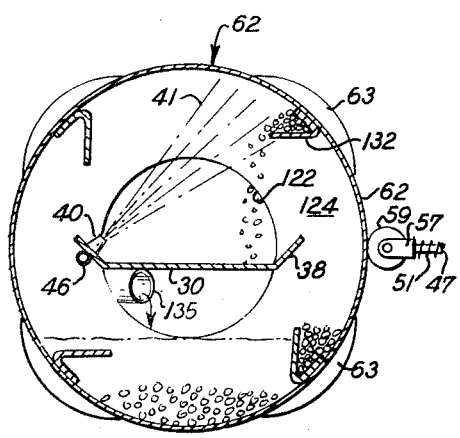
FIG. 6 is a detail illustrating the spraying of cutting fragments carried by the vanes to the upper end of the drum for discharge.

As shown in FIGS. 4 and 5, the drilling fluid and cuttings are carried by a duct 134 supported to the frame member 16 by bracket 136 with the outlet opening 135 protruding through the open bore 122 of the forward end A of the drum, discharging drilling mud and cuttings therein in continuous mud flow through the drum. The mud supply is in a measured continuous flow to provide, together with the water spray emitted from nozzles 40, a level of mud liquids and solids in the bottom of the drum as shown in FIG. 6, below the depth of the bore 122. Thus, the mud in the drum is retained by the end plate 124 above the height of the intermediate and outlet riffle plates 126 and bore 128 therein, as shown in FIG. 3, whereby the fluids, the water and the mud, continuously leave the drum flowing over the after riffle plate 126, continuously discharging from the bore 128 and slots 130.

In operation, drilling mud withdrawn from a well passing to a mud pit so as to contain a normal suspension of cuttings therein, has a small proportionate quantity passed into the drum continuously. The mud pours into the bottom of the drum as it is slowly rotated by motor 112 at a rate, adjusted by the speed reducing mechanism, at from about one-sixth to about one revolution per minute, the riffles operating to aid the rapid deposition of solid cuttings therefrom. The cuttings are picked up by the slow moving vanes, and as each reaches a vertical position above the level of the trough, cam track 63 engages the valve rotor 59 opening the valve 44 for flow of wash water therethrough, thus energizing a spray of water from the nozzles 40. The water spray is in a wide fan which falls upon the cuttings and mud, both falling and disposed in the vane slowly rising countercurrent to the spray and discharging its contents on the trough. The spray continues to wash the mud from the cuttings as they are dumped upon trough 30 as shown in FIG. 6. The washed cuttings are vibrated on the inclined trough and thus pass angularly downward toward the forward outlet end A, being vibrated continuously to remove mud and water and reach a point 34 above the sampling box 52 to discharge fine cuttings which are able to pass through the perforations therein into a sampling box. Larger particles pass out the open end 50 of the trough. The contents of each sampling box may be manually placed into a bag or other container for securing the contents until they can be tested, various orienting data also being marked on the bag to identify the sample. Each sample may be the product of one or several revolutions of the drum, and the operating engineers are able to calculate by the rate of mud flow through the drill and also the timing and depth of the drilling at that particular moment, almost the exact orienting point of subterranean origin of any particular cutting sample; such orienting data being marked upon the bag.

As stated, the packaging of each sampling can be carried out automatically by having several containers 52 mounted upon a conveyor belt 56 cooperating with a packaging machine which will mechanically effect the packaging of each sample.

The riffle plates 126 disposed at the end as well as intermediate points of the drum enhance the rate of settling of cuttings suspended in the mud, whereby each trough load 132 contains a representative quantity of the cutting flowing momentarily through the drum.

It is possible, of course, to use several cams 63, as many as there are vanes, each disposed about the circumference, so that the water spray washes a single vane load of cuttings, and by reaching a discontinuing cam position of the drum in contract with roller 59, the valve will be shut off until the next vane load is in position to dump its contents into the trough, whereby a minimum quantity of water may be used only as needed for washing each vane load.

The mud flowing from the drum outlet end B may be carried away from the device by conduits or troughs (not shown), but usually the device may be mounted right above the mud pit at the drill site, for return of the mud thereto.

While in drilling operations the rotary bit tends to cut bits of rock of relatively even size, as the drilling fluid passes upward around the casing in return to the mud pit, bits of larger sized rock and clay may slough off of the wall of the well bore so that cuttings being sampled in the device hereof often contain larger particles not typical of cuttings at the bit position. It is for this reason to exclude such larger particles that the cuttings are preferably sifted through perforations 48 disposed near the outer end of trough 30. The large particles which do not pass through the perforations pass outward over the open end of the trough 34 and are disposed of extraneously by the system.

In a modified form shown in FIG. 8, a flaring conical shield is fitted with its small diameter to the annular cutaway portion 122 of the forward plate to flare conically outwardly. The conical shield 138 also has perforations 140 therein sized to allow normal cuttings to pass therethrough. However, it is preferred that the trough 30 have a large slotted or cutaway portion 136 in its end through which ordinary sized cuttings or larger fragments of rock may pass, which, falling through the slot 136, are intercepted by the rotating conical shield 138 for classification. Again, as described above, the normally sized cuttings for sampling pass through the perforations 140 and drop into a receptacle 52 for mechanical or manual removal and packaging for a subsequent test.

A small adjustable inclined surface plate or trough 142 is supported slideably by an upright bracket 144, being pinned by a bolt 146 which holds the trough 142 through a slot 143. The inner end of the trough 142 may have an arcuately cutaway portion 148. In this manner, the small trough 142 may be positioned beneath the conical shield 138 so that a large or small quantity, as desired, of cuttings sifted through the perforations 140, may be dropped into receptacle 52 and an adjustably large or small quantity of cuttings falling beneath the conical shield may be intercepted by the trough 142 and passed outwardly therealong to be discarded from the system. Hence, by adjusting the position of the small trough 142 beneath the rotating perforated shield 138, a variable quantity of cuttings sifted through the perforations may be sampled, as desired, increasing or decreasing the quantity of cuttings discarded by adjustment of the position of trough 142.

The resilient support for forward end of the trough 30 is not shown in FIG. 8, but it may be similarly supported upon springs as shown in FIG. 5, framing members 10 being extended to the end of trough 34 for support near that point.

As thus described samplings of well bore cuttings are regularly and continuously separated from drilling mud as it flows, usually from the drill site to the mud pit, whereby the origin of the sample can be oriented with the drilling as the earth boring progresses. The mud having cuttings suspended therein is flowed into a rotating drum which contains riffles to enhance the settling of the cuttings, the flowing mud continuously overflowing the outlet riffle for return to the mud pit. The drum rotates continuously and longitudinally disposed vanes mounted on its cylindrical walls pick up settled cuttings, lifting them from the mud as they rotate with the drum wall to an upper position, depositing the cuttings upon a vibrating trough passing through the open ends of the drum. The trough is angularly mounted to remove the cuttings to a perforated portion which classifies them to a suitable size. The samplings are continuously washed by a spray of water as they move into a position for deposit on the trough. The samplings are collected in a container, the convents of which may be manually packaged or moved by conveyor to an automatic packaging machine so that each sample as taken may be continuously and manually packaged and identified for subsequent examination and test. This packaging of cleaned particles promptly oriented is of great value to preserve the cuttings and orient them with respect to the drilling site for further examination and control of the drilling operation.

Various modifications will occur to those skilled in the art. Other rotating means for the drum may be applied. Other means for supporting and rotating the drum may be used. The particles may be classified by differently sized perforations in the trough or the trough may merely pass the cuttings to another classifying means to separate the cuttings into separately-sized particle samples. Indeed, the sampling device 52 itself may be replaced by a trough or screen having perforations of even a finer size, wherein the bottom of the sampling device 52 itself may be a fine screen to remove particles of a dust-like character. It is possible, moreover, to add identifying particles to the mud stream passed to the drilling site which will remain with the mud, the identifying particles being themselves colored or shaped to be identifiable merely as identifying particles, whereby the origin of the samplings containing such identifying particles may be more easily calculated with regard to flow rates, etc.

While the device is intended to be used in conjunction with drilling muds for purposes of sampling cuttings carried by the drilling mud, usually in oil well drilling, it may be used to identify any earth boring samplings using any kind of drilling fluid and indeed may be used for sampling many particle suspension products whereby the particles may be suspended in a liquid and then readily reclaimed from that suspension by rotating in the drum as herein described in the manner described; for example, hydraulically mined slurries and the like.

Accordingly the above description is given by way of illustration and not by way of limitation of the invention which is defined in the claims.

What is claimed is:

1. Device for collecting samplings of particles suspended in a flowing liquid, comprising a cylindrical drum having imperforate walls mounted for rotation with its axis horizontal, said drum having openings of smaller diameter than the drum wall at each end, said drum wall supporting at least one coaxial vane extending angularly inward from the wall surface and providing a supporting trough for settled particles between the angular vane surface and the arcuate wall of the drum, means for flowing a liquid suspension of the particles to be sampled from end to end of said drum, means for slowly rotating said drum while allowing suspended particles to settle from said liquid whereby the vane, upon rotation of said drum, angularly lifts settled particles and conveys a portion thereof arcuately upward with the drum surface as the drum rotates to an upper arcuate discharge position of said angularly extending vane, a trough disposed centrally and angularly downward through said openings of said drum for receiving and discharging recovered particles from said drum at its lower end, said vane in said upper discharge position of said drum depositing said particles in downward falling cascade upon the upper surface of said positioned trough, and means beneath the discharge end of said trough for collecting the particles transferred by said trough outwardly of said rotating drum.

2. The device as defined in claim 1 including means for resiliently supporting said trough within said rotating drum, and means is further provided for vibrating said trough to enhance movement of said particles thereon toward its discharge end outside of said drum.

3. The device as defined in claim 1 wherein the trough is resiliently mounted and angularly disposed within said drum, means is provided for vibrating said trough for enhancement of particle flow deposited thereon, said trough having a portion near its discharge end perforated, whereby vibrated particles are sifted through the perforations to separate evenly sized particles from larger ones moving upon the surface of said trough.

4. The device as defined in claim 1 including several nozzles disposed within said drum, said nozzles being positioned to discharge streams of water upon the particles contained in and lifted by a vane as the rotating drum positions the vane into discharge position to wash suspending fluid from the particles as they are discharged upon said trough, and duct means supplying water to said nozzles.

5. The device as defined in claim 4 wherein the water nozzles are mounted upon the vibrating trough and the stream of water is vibrated responsive to the vibration of said trough.

6. The device as defined in claim 4 wherein the water supplied to said nozzles is controlled by a valve, said valve having means for opening the same for supply of water to said nozzles responsive to the position of said vane, whereby a washing stream of water is applied to the vane as it reaches its upper discharge position.

7. The device as defined in claim 1 wherein a series of several vanes are disposed evenly spaced about the cylindrical surface of said drum.

8. Device as defined in claim 1 wherein a series of several of said vanes are disposed evenly spaced about the cylindrical surface of said drum, several nozzles are mounted within the drum directed to discharge streams of water upon the particles contained in a vane as the rotating drum positions the vane into discharge position to wash suspending fluid from the particles as they are discharged upon said trough, the water supply to said nozzles being controlled by a valve, cam means rotated by said drum and responsive to the position of said vanes for opening said valve for supply of water to said nozzles, whereby a washing stream of water is played upon each vane and particles therein as it reaches its particle discharge position, the water discharged from said nozzles being discontinued by closure of said valve at intermediate vane positions.

9. The device as defined in claim 1 wherein said drum has a discharge shield disposed about its particle outlet opening and flaring conically from the said drum opening to the discharge end, said conical shield having perforations in the surface whereby to sift particles flowing thereover to separate particles classified evenly according to said perforations, and said container means for collecting said sifted particles being disposed beneath said perforations, said trough having openings at the outlet end of said drum whereby all of the particles passing thereon are discharged upon said conical shield.

10. The device as defined in claim 1 wherein several of said container means for collecting said particles transferred by said trough outwardly of said rotating drum are disposed in a series upon a moving belt whereby the container means and sample contents discharged are regularly transferred away from said sampling device for packaging of the sample contents of each container.

11. Device as defined in claim 1 wherein said drum has closure plates in both ends, each plate having a concentrically cut annular opening about the axis of said drum, the outlet end opening for the continuous flowing fluid being larger than the opening at the inlet end, the closure plate in said outlet end forming a riffle over which the discharging fluid flows, whereby the fluid deposits its larger suspended particles within the drum as it flows outward thereof.

12. The device as defined in claim 11 wherein there is at least one additional riffle comprising a similar plate disposed intermediate between said inlet and outlet closure plates, the annular opening therein being larger than the plate opening at the inlet end of said drum, the outlet plate and said intermediate plate forming riffles adapted to intercept and facilitate settling of suspended particle cuttings from the fluid flowing thereover as it passes out of said drum, each of said riffle plates having at least one slot cut radially therethrough from the annular opening to the drum wall, allowing some sedimentary particles to be discharged through said slots.

13. Device for collecting samplings of cuttings suspended in oil well drilling mud as it passes from a well to a mud pit, comprising an imperforate cylindrical walled drum mounted for rotation with its axis substantially horizontal, said drum having plate closures with concentric annular openings at each end smaller in diameter than the drum wall, the opening at the sample cutting discharge end being of smaller diameter than the opening at the opposite mud discharge end, means for rotating said drum, vanes in said drum axially extending substantially the length thereof and disposed angularly inward from the cylindrical surface of said drum, each vane forming a supporting trough for recovery of sample cuttings between its angular surface and the arcuate wall of the drum, means for continuously passing drilling mud containing said cuttings into the smaller drum opening whereby the fluid after depositing cuttings in said drum flows outwardly through the larger opening at the opposite end, means for slowly rotating said drum to allow cuttings to settle from a mud stream passed therethrough, a trough mounted angularly downward and extending through said drum openings with its upper end extending through the larger mud discharge opening and its lower end through the smaller drum opening, said trough being positioned centrally of said drum to receive sample cuttings lifted by a vane and rotated with the arcuate surface of said drum to an upper arcuate discharge position from which the cuttings supported in the vane discharge in a cascade downward upon said trough, and means for washing the cuttings free of drilling mud by a stream of water discharged thereon as the cuttings in a vane approach and reach a discharge position, and container means for regularly collecting samples of said sample cutting particles as they pass along said trough outward of said drum.

14. The device as defined in claim 13 wherein the outlet plate closure of said drum having a larger opening than said inlet plate closure is slotted and forms a riffle, and at least one other slotted riffle plate is disposed in said drum intermediate between inlet and outlet plates, said intermediate riffle plate having an opening larger than said inlet plate.

15. The device as defined in claim 13 wherein the trough is resiliently supported within said drum and includes means for vibrating the trough, said trough being perforated at its discharge end whereby to classify the cuttings according to the sizes provided by said perforations and collecting the sifted cuttings in said container means.

16. The device as defined in claim 1 including a framework, rollers mounted upward of the lower ends thereof rotatably supporting said drum, a driving motor on said framework, a speed-reducing power transmission connected to said motor and to said drum for driving said drum at a slowly rotating rate between one-sixth and one revolution per minute, said trough extending outwardly of said drum at each end through said annular openings therein, bracketing members extending from said framework near each end of said trough and interconnecting therewith through spring means resiliently supporting said trough, a rotary, eccentrically mounted weight connected to one extending end of said trough and a driving motor on said frame connected to rotate said weight whereby to apply a vibrating movement to said trough, perforations in the opposite end of said trough sized to pass sample cuttings therethrough, said opposite end of said trough being open whereby particles too large to pass through said perforations cascade outward through the outlet end of said trough, and container means positioned beneath said perforations for collecting sample particles passed through said perforations.

17. The device as defined in claim 9 wherein a secondary outer trough is adjustably mounted beneath the outlet end of said main trough and positioned to intercept larger particles discharged from the open end thereof as well as a selected portion of sifted particles passing through the perforations thereof, discharging the same away from said device, whereby only a selected portion of sifted particles are collected in the container positioned beneath said perforations.

18. The device as defined in claim 16 wherein a secondary outer trough is adjustably mounted beneath the outlet end of said main trough and positioned to intercept larger particles discharged from the open end thereof as well as a selected portion of sifted particles passing through the perforations thereof, discharging the same away from said device, whereby only a selected portion of sifted particles are collected in the container positioned beneath said perforations.

* * * * *